(12) United States Patent
Shin

(10) Patent No.: US 12,168,394 B2
(45) Date of Patent: Dec. 17, 2024

(54) IN-WHEEL DRIVE DEVICE AND VEHICLE INCLUDING THE SAME

(71) Applicant: HYUNDAI MOBIS CO., LTD., Seoul (KR)

(72) Inventor: Kyeong Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 707 days.

(21) Appl. No.: 17/384,897

(22) Filed: Jul. 26, 2021

(65) Prior Publication Data

US 2022/0024303 A1 Jan. 27, 2022

(30) Foreign Application Priority Data

Jul. 27, 2020 (KR) .................. 10-2020-0093325

(51) Int. Cl.
*F16H 57/029* (2012.01)
*B60B 27/00* (2006.01)
*B60K 7/00* (2006.01)
*B60K 17/04* (2006.01)
*F16H 57/04* (2010.01)
*F16H 57/08* (2006.01)

(52) U.S. Cl.
CPC ........ *B60K 17/046* (2013.01); *B60B 27/0047* (2013.01); *B60B 27/0073* (2013.01); *B60B 27/0078* (2013.01); *B60K 7/0007* (2013.01); *F16H 57/029* (2013.01); *F16H 57/0479* (2013.01); *B60B 2900/5118* (2013.01); *F16H 2057/085* (2013.01)

(58) Field of Classification Search
CPC .. F16H 57/0472; F16H 57/079; F16H 57/029; F16H 57/082; F16H 2057/085; B60K 17/046; B60K 7/0007; B60B 27/0073; B60B 27/0078; B60B 35/125; B60B 2900/5118
USPC ............................ 475/331, 159, 160; 180/372
See application file for complete search history.

(56) References Cited

U.S. PATENT DOCUMENTS

| | | | |
|---|---|---|---|
| 7,214,155 B2 * | 5/2007 | Mueller ............... | B60K 7/0007 475/5 |
| 8,944,196 B2 * | 2/2015 | Yamada .............. | B60B 27/0026 301/6.5 |
| 2006/0070778 A1 * | 4/2006 | De Veny ............. | B60K 17/046 180/65.1 |
| 2023/0077725 A1 * | 3/2023 | Shin ..................... | B60K 7/0007 301/6.5 |

FOREIGN PATENT DOCUMENTS

EP  0543451 A1 * 5/1993 ........... B60K 17/046

* cited by examiner

*Primary Examiner* — Roger L Pang
(74) *Attorney, Agent, or Firm* — NSIP Law

(57) ABSTRACT

An in-wheel drive device includes: a wheel bearing including a hub; and a speed reducer at least partially disposed in an internal space of the wheel bearing. The speed reducer includes: planet gears; a ring gear configured to engage the planet gears; and a carrier coupled to the planet gears and configured to transmit, to an outside of the in-wheel drive device, power generated by a revolution of the plurality of planet gears. A first sealing part is disposed in a region in which the carrier and the wheel bearing face each other.

18 Claims, 5 Drawing Sheets

IN-WHEEL DRIVE DEVICE AND VEHICLE INCLUDING THE SAME

CROSS-REFERENCE TO RELATED APPLICATION

This application claims priority to and the benefit of Korean Patent Application No. 10-2020-0093325 filed in the Korean Intellectual Property Office on Jul. 27, 2020, the entire contents of which are incorporated herein by reference.

TECHNICAL FIELD

The present disclosure relates to an in-wheel drive device and a vehicle including the same, and more particularly, to an in-wheel drive device having a sealing part for sealing the in-wheel drive device, and a vehicle including the in-wheel drive device.

BACKGROUND ART

A motor for converting electrical energy into kinetic energy may be applied to various fields and mounted in various devices. For example, the motor may be mounted in a vehicle and produce power for driving the vehicle. In particular, with the increase in demands for environmentally friendly vehicles for solving problems of environmental pollution emitted from internal combustion engines in the related art, there is also an increasing demand for the motor mounted in the vehicle.

An in-wheel drive device having a structure in which a motor is mounted in a wheel for a vehicle generally has a wheel bearing, a speed reducer, and the like in addition to the motor. The wheel bearing and the speed reducer, which are provided in the in-wheel drive device, need to be essentially lubricated. Therefore, the in-wheel drive device in the related art is provided therein with lubricating oil for lubricating the wheel bearing and the speed reducer and also has seals for preventing a leakage of the lubricating oil.

Meanwhile, among the components, which constitute the wheel bearing and the speed reducer, some components rotate as the motor in the in-wheel drive device operates and a motor shaft rotates. In the related art, in order to prevent a leakage of the lubricating oil in regions in which the components rotate relative to one another, rotary seals are often mounted in those regions.

However, in the related art, the rotary seal has a larger volume and a more complicated structure than a stationary seal provided in a region in which the components do not move relative to one another, which causes a problem of an increase in cost and time required to manufacture the in-wheel drive device.

In addition, in the related art, since the components rotate relative to one another in the regions in which the rotary seals are mounted, rotational friction occurs between the rotary seal and the component adjacent to the rotary seal. Therefore, there is also a problem in that the rotational friction degrades the overall efficiency of the in-wheel drive device and causes vibration and noise in the in-wheel drive device.

In addition, in the related art, because a space in the wheel bearing required to be lubricated is separated from a space in the speed reducer required to be lubricated as the rotary seal is mounted, there is a problem in that the wheel bearing and the speed reducer are separately lubricated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an in-wheel drive device includes: a wheel bearing including a hub; and a speed reducer at least partially disposed in an internal space of the wheel bearing. The speed reducer includes: planet gears; a ring gear configured to engage the planet gears; and a carrier coupled to the planet gears and configured to transmit, to an outside of the in-wheel drive device, power generated by a revolution of the plurality of planet gears. A first sealing part is disposed in a region in which the carrier and the wheel bearing face each other.

The first sealing part may be fixed to the carrier and the wheel bearing.

The in wheel bearing may further include an outer race disposed outward, in a radial direction of the in-wheel drive device, from the hub. The first sealing part may be disposed in a region in which the carrier and the outer race face each other.

A groove portion having a recessed shape may be disposed in an area of the outer race that faces the carrier, and the first sealing part may be disposed in the groove portion.

The wheel bearing may further include: rolling elements disposed in an internal space between the hub and the outer race; and a second sealing part spaced apart from the first sealing part in a width direction of the in-wheel drive device, such that the rolling elements are disposed between the second sealing part and the first sealing part.

The second sealing part may be movable relative to the hub or the outer race.

The in-wheel drive device may further include: bolts configured penetrating the carrier in the width direction; and a third sealing part disposed on an outer surface of each of the bolts.

The third sealing part may be fixed to the bolt and the carrier.

The bolts may each include: a bolt body penetrating a through-hole of the carrier; and a bolt head disposed at one end, in a longitudinal direction, of the bolt body and having a larger diameter than the through-hole of the carrier. The third sealing part may be disposed in a boundary region between the bolt body and the bolt head.

The rolling elements may include: a first rolling element disposed in the internal space between the hub and the outer race; and a second rolling element spaced apart from the first rolling element in the width direction. A distance between the first rolling element and the first sealing part may be shorter than a distance between the second rolling element and the first sealing part.

The in-wheel drive device may further include: a lubricating oil flow path configured to connect a space between the planet gears and the ring gear to a space between the first rolling element and the second rolling element.

The lubricating oil flow path may be disposed in an outer region of the first rolling element, in the width direction.

The second sealing part may be disposed in an outer region of the second rolling element, in the width direction, and in a space between the second rolling element, the outer race, and the hub.

The in-wheel drive device may further include a fourth sealing part disposed in an outer region of the first rolling element, in the width direction. The fourth sealing part may separate a space between the planet gears and the ring gear from a space between the first rolling element and the second rolling element.

The fourth sealing part may be movable relative to the hub or the outer race.

The in-wheel drive device may further include: a fifth sealing part disposed inward, in the radial direction, from the hub.

The fifth sealing part may be disposed between the hub and the carrier in the radial direction.

The fifth sealing part may be movable relative to the hub or the carrier.

The hub may include: a hub body; and a hub forming part having a shape bent toward the first rolling element and disposed at one end, among two opposite ends of the hub body, that is adjacent to the first rolling element. The fifth sealing part may face the hub forming part in the radial direction.

In another general aspect, a vehicle includes an in-wheel drive device including: a wheel bearing including a hub; and a speed reducer at least partially disposed in an internal space of the wheel bearing. The speed reducer includes: planet gears; a ring gear configured to engage the planet gears; and a carrier coupled to the planet gears and configured to transmit, to an outside of the in-wheel drive device, power generated by a revolution of the planet gears. A first sealing part is disposed in a region in which the carrier and the wheel bearing face each other.

Other features and aspects will be apparent from the following detailed description, the drawings, and the claims.

DETAILED DESCRIPTION

Hereinafter, an in-wheel drive device and a vehicle according to the present disclosure will be described with reference to the drawings.

In-Wheel Drive Device

Figure 1:
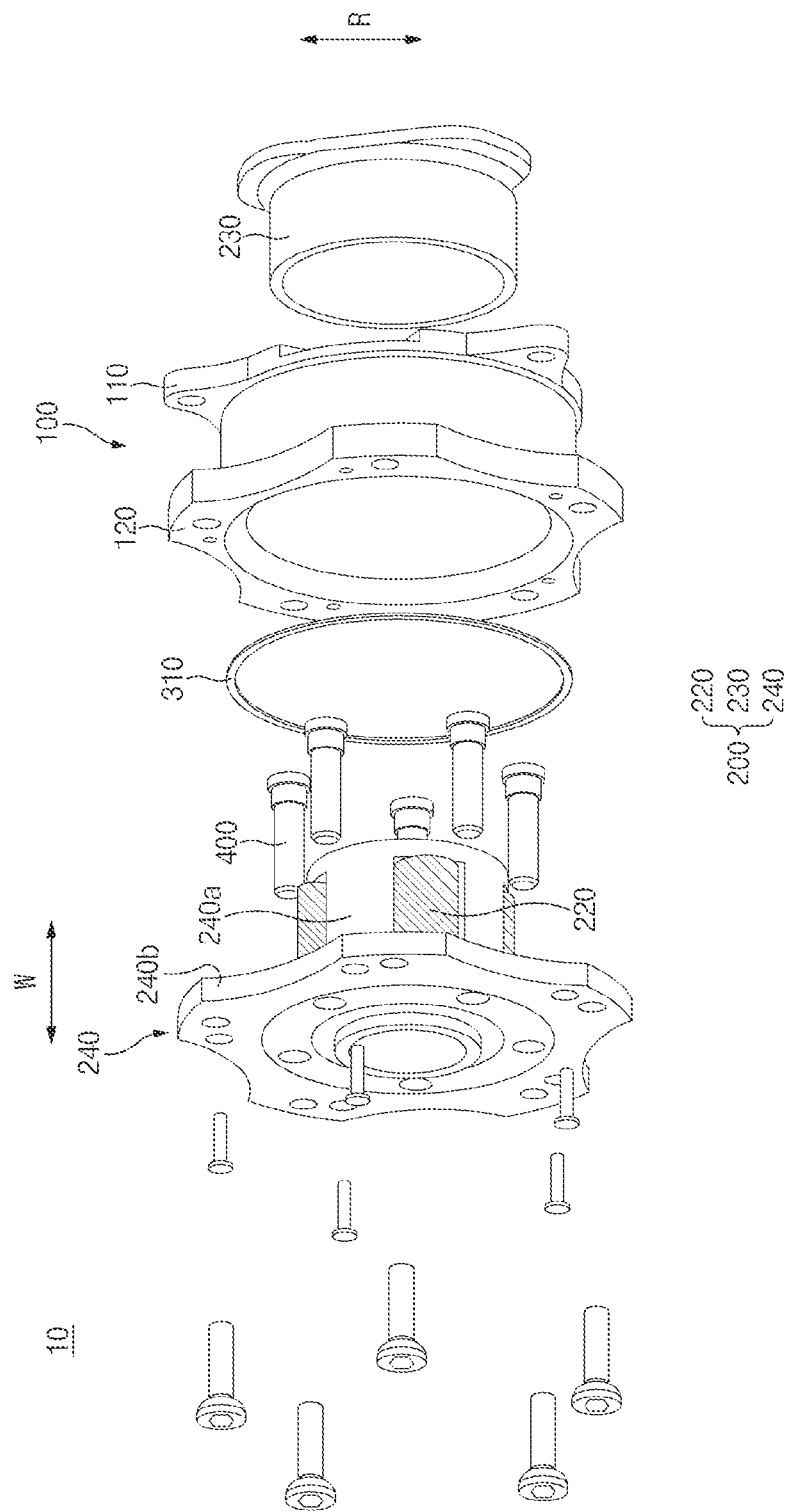
FIG. 1 is an exploded perspective view of an in-wheel drive device according to a first embodiment of the present disclosure.
Figure 2:
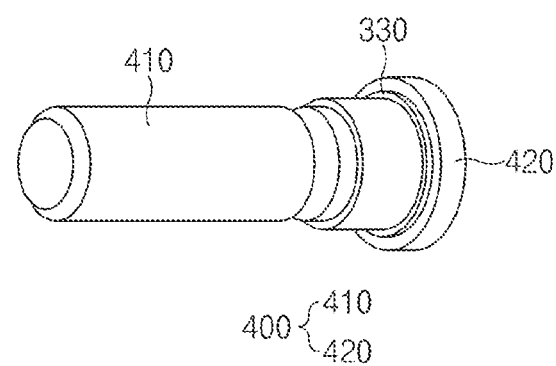
FIG. 2 is an enlarged perspective view of a bolt provided in the in-wheel drive device according to the first embodiment of the present disclosure.

FIG. 1 is an exploded perspective view of an in-wheel drive device according to a first embodiment of the present disclosure, and FIG. 2 is an enlarged perspective view of a bolt provided in the in-wheel drive device according to the first embodiment of the present disclosure. Further, FIG. 3 is a radial cross-sectional view of the in-wheel drive device according to the first embodiment of the present disclosure.

Figure 3:
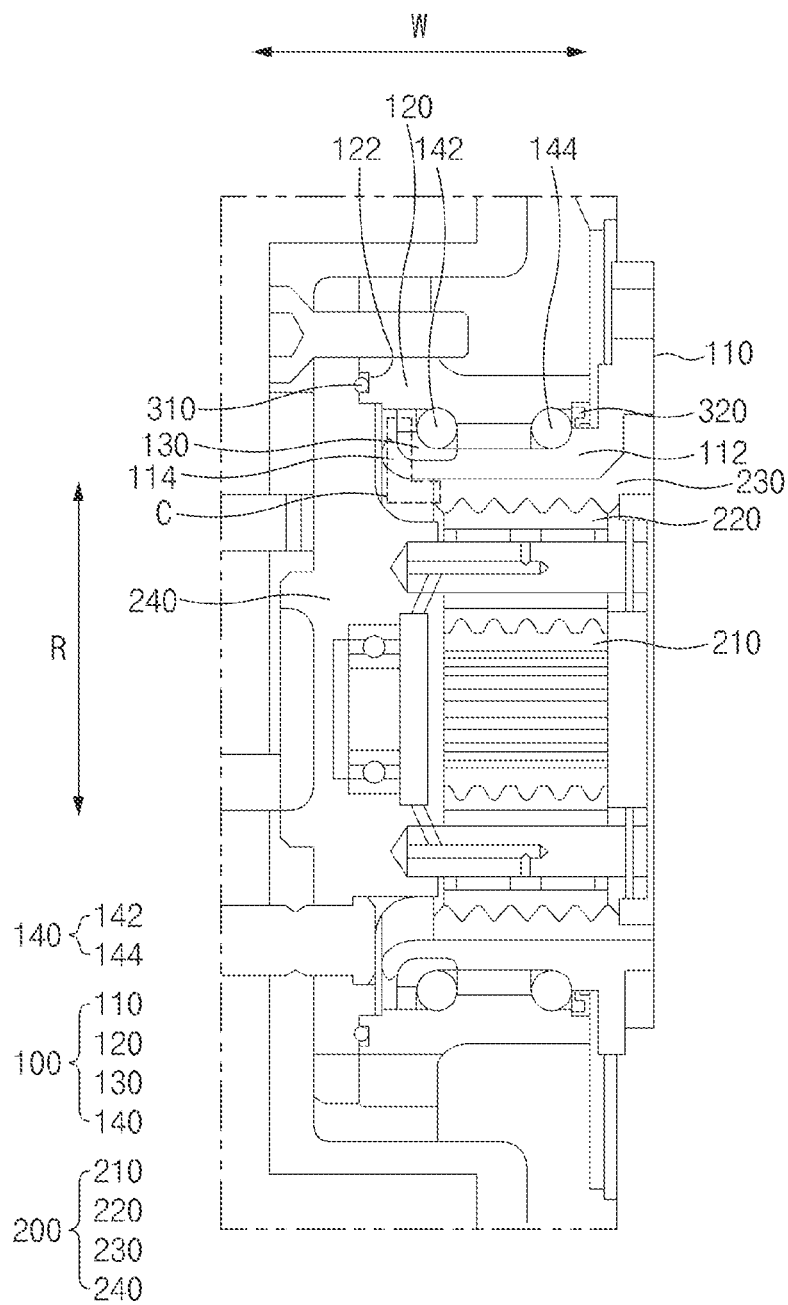
FIG. 3 is a radial cross-sectional view of the in-wheel drive device according to the first embodiment of the present disclosure.

As illustrated in FIGS. 1 to 3, an in-wheel drive device 10 according to the present disclosure may include a motor, a wheel bearing 100 provided at one side of the motor, and a speed reducer 200 coupled to the wheel bearing 100. In more detail, at least a part of the speed reducer 200 may be provided in an internal space of the wheel bearing 100. A coupling relationship between the wheel bearing 100 and the speed reducer 200 will be described below.

Meanwhile, the wheel bearing 100 and the speed reducer 200, which constitutes the in-wheel drive device 10 according to the present disclosure, may each include a cylindrical area, as illustrated in FIGS. 1 and 3. In the present specification, a direction from a central axis of the cylindrical area toward an outer side of the cylindrical area will be referred to as a radial direction R of the in-wheel drive device 10, and a direction, which is a thickness direction of the outer side of the cylindrical area and is perpendicular to the radial direction R, will be referred to as a width direction W of the in-wheel drive device 10.

Continuing to refer to FIGS. 1 and 3, the wheel bearing 100 may include a hub 110 and an outer race 120 provided outward in the radial direction R from the hub 110. In this case, the hub 110 may be fixed regardless of a rotation of the motor, and the outer race 120 may rotate together with the motor when the motor rotates. That is, the hub 110 may be a stationary race, and the outer race 120 may be a rotary race. Alternatively, the hub 110 may be a rotary race, and the outer race 120 may be a stationary race.

In addition, the wheel bearing 100 may include a rolling element 140 provided in an internal space between the hub 110 and the outer race 120. As illustrated in FIGS. 1 and 3, the rolling element 140 may be provided in plural, and the plurality of rolling elements 140 may be provided in the width direction W. For example, the rolling elements 140 may include a first rolling element 142 provided in the internal space between the hub 110 and the outer race 120, and a second rolling element 144 spaced apart from the first rolling element 142 in the width direction W. FIG. 3 illustrates that among the rolling elements 140, the first rolling element 142 is provided at a relatively left side, and the second rolling element 144 is provided at a relatively right side.

Meanwhile, the hub 110 may include a hub body 112 and a hub forming part 114. The hub body 112 may define a body of the hub 110, and the hub forming part 114 may have a shape bent toward the first rolling element 142 and be provided at one of the two opposite ends of the hub body 112 which is adjacent to the first rolling element 142. In more detail, the hub body 112 may mean an area of the hub 110 from which the hub forming part 114 is excluded.

Continuing to refer to FIGS. 1 and 3, the wheel bearing 100 may further include an inner race 130 provided between the first rolling element 142 and the hub 110. In more detail, the inner race 130 may be fixed to the hub 110 by being pressed by the hub forming part 114.

Meanwhile, the speed reducer 200 of the in-wheel drive device 10 according to the present disclosure may include a sun gear 210 connected to an input shaft, and a plurality of planet gears 220 provided outward from the sun gear 210 and configured to engage with the sun gear 210. The plurality of planet gears 220 may be provided at an equal interval and disposed around the sun gear 210.

In addition, the speed reducer 200 may further include: a ring gear 230 configured to surround outer surfaces in the radial direction R of the plurality of planet gears 220 and engage with the plurality of planet gears 220; and a carrier 240 coupled to the planet gears 220 and configured to transmit, to the outside, power generated by the revolution of the plurality of planet gears 220 around the sun gear (i.e., the movement of the plurality of planet gears 220 along an outer surface of the sun gear 210). That is, according to the present disclosure, the carrier 240 may rotate about its center by the revolution of the planet gears 220 around the sun gear, and the rotation of the carrier 240 may be transmitted to a wheel (not illustrated).

Meanwhile, as illustrated in FIGS. 1 and 3, the carrier 240 may be configured to accommodate the plurality of planet gears 220. The carrier 240 may have through-holes through which the planet gears 220 are exposed to the outside, so that the plurality of planet gears 220 may engage with the sun gear 210. In more detail, the carrier 240 may include: a carrier body 240a configured to accommodate the plurality of planet gears 220 and having the through-holes through which the plurality of planet gears 220 is exposed to the outside, and a carrier head 240b provided at one side of the carrier body 240a and having a larger width in the radial direction R than the carrier body 240a.

In addition, according to the present disclosure, in the in-wheel drive device 10, the carrier 240 and the wheel bearing 100 may face each other in the width direction W. For example, as illustrated in FIG. 3, the carrier head 240b may face the outer race 120 of the wheel bearing 100 in the state in which the in-wheel drive device 10 is assembled. More particularly, the carrier 240 and the outer race 120 may be coupled to each other by outer race-carrier fixing members 500 that penetrate the carrier head 240b and the outer race 120.

In this case, according to the present disclosure, a first sealing part 310 may be provided in a region in which the carrier 240 and the wheel bearing 100 face each other in the width direction W. For example, the first sealing part 310 may be provided in the region in which the carrier 240 and the outer race 120 face each other. In more detail, the first sealing part 310 may be provided in the region in which the carrier head 240b and the outer race 120 face each other.

Meanwhile, a groove portion 122 having a recessed shape may be provided in an area of the outer race 120 that faces the carrier 240, and the first sealing part 310 may be inserted into the groove portion 122.

Meanwhile, as described above, the carrier 240 and the outer race 120 may be coupled to each other by the outer race-carrier fixing members 500, such that the carrier 240 and the outer race 120 may be fixed to each other. In particular, as described above, the outer race 120 may be a rotary race that is rotated by the rotation of the motor. Since the carrier 240 is fixed to the outer race 120, the outer race 120 and the carrier 240 may not move relative to each other even when the outer race 120 rotates.

Therefore, according to the present disclosure, the first sealing part 310 provided between the carrier 240 and the outer race 120 may be provided in a state of being fixed relative to the carrier 240 and the outer race 120. That is, the first sealing part 310 may be a stationary seal.

The types of seals for sealing a space between two components may be broadly classified into a rotary seal and a stationary seal. The stationary seal is configured to seal a space between two components that do not move relative to each other. The rotary seal is configured to seal a space between two components that move relative to each other.

Because the two components provided at the two opposite sides of the stationary seal are fixed to each other, the stationary seal may properly perform the sealing function as long as the stationary seal is in close contact with the two components. Therefore, the stationary seal often has a structure with a simple ring shape. FIG. 1 also illustrates the first sealing part 310 with a ring shape.

In contrast, the rotary seal is provided between the two components that move relative to each other. Therefore, in order to properly perform the sealing function, the rotary seal needs to have not only sealability but also durability against loads and friction applied to the rotary seal while the two components move relative to each other. Therefore, the rotary seal has a more complicated structure than the stationary seal.

Meanwhile, in the related art, because the speed reducer and the wheel bearing of the in-wheel drive device are required to be lubricated, lubricating oil is provided in the speed reducer and the wheel bearing, and seals are provided in the vicinity of the speed reducer and the wheel bearing in order to prevent a leakage of the lubricating oil. For example, in the case of the wheel bearing, it is necessary to lubricate an area in which the rolling element and the outer race adjoin each other, an area in which the rolling element and the hub adjoin each other, and an area in which the rolling element and the inner race adjoin each other. Therefore, in the related art, lubricating oil is provided around the rolling element, and a seal is provided outward from the rolling element. However, the rolling element is configured to move relative to the outer race, the hub, and the inner race, and the outer race is also configured to move relative to the hub and the inner race. Thus, the rotary seals need to be provided at two opposite outer sides of the rolling element.

However, according to the present disclosure, even though a rotary seal is not provided at any one of the two opposite outer sides of the rolling element, it is possible to smoothly lubricate the inside of the wheel bearing using the lubricating oil and prevent a leakage of the lubricating oil to the outside. That is, as illustrated in FIG. 3, the carrier head 240b may be closer to the first rolling element 142 than the second rolling element 144. Thus, a distance between the first rolling element 142 and the first sealing part 310 may also be shorter than a distance between the second rolling element 144 and the first sealing part 310.

Therefore, according to the present disclosure, when the first sealing part 310 is provided in the region in which the carrier 240 and the outer race 120 face each other, a leakage of the lubricating oil to the outside may be prevented by the first sealing part 310 even though no rotary seal is provided outward from the first rolling element 142. Therefore, in comparison with the related art, it is possible to minimize the number of rotary seals mounted at the periphery of the wheel bearing 100 and prevent the problem of friction or noise that may be caused by the rotary seal.

Meanwhile, as described above, in the in-wheel drive device, the speed reducer is also required to be lubricated in addition to the wheel bearing. According to the present disclosure, a rotary seal may not need to be mounted outward from the first rolling element 142. Therefore, a lubricating oil flow path C, which is a route through which the lubricating oil may flow, may be provided between a space (hereinafter, referred to as a 'first space') between the planet gears 220 and the ring gear 230 provided in the speed reducer 200 and a space (hereinafter, referred to as a 'second space') between the first rolling element 142 and the second rolling element 144. This may mean that the lubricating oil flow path C has a large width to the extent that the lubricating oil flow path C may smoothly perform the lubrication function in the second space by transferring the lubricating oil in the first space to the second space and smoothly perform the lubrication function in the first space by transferring the lubricating oil in the second space to the first space. Therefore, in the configuration of the related art in which the rotary seal is provided outward from the first rolling element 142, the lubricating oil in the first space cannot be smoothly transferred to the second space, and the lubricating oil in the second space cannot be smoothly transferred to the first space. Therefore, it can be seen that this configuration does not have the lubricating oil flow path C. Meanwhile, as described above, according to the present disclosure, the lubricating oil flow path C may be provided because no rotary seal is provided outward from the first rolling element 142. Therefore, as illustrated in FIG. 3, the lubricating oil flow path C may be provided in an outer region in the width direction W of the first rolling element 142.

Continuing to refer to FIGS. 1 to 3, the in-wheel drive device 10 according to the present disclosure may further include a second sealing part 320 spaced apart from the first sealing part 310 in the width direction W with the rolling element 140 interposed therebetween. Therefore, the second sealing part 320 may be provided in an outer region in the width direction W of the second rolling element 144. More particularly, the second sealing part 320 may be provided in the outer region in the width direction W of the second rolling element 144 and disposed in a space surrounded by the second rolling element 144, the outer race 120, and the hub 110.

Meanwhile, the second sealing part 320 may be provided to be movable relative to the hub 110 or the outer race 120. In more detail, some components of the second sealing part 320 may be provided to be movable relative to the hub 110 or the outer race 120. That is, the second sealing part 320 may be a rotary seal.

Meanwhile, as illustrated in FIGS. 1 and 2, the in-wheel drive device 10 may include a plurality of bolts 400 that penetrates the carrier 240 in the width direction W. FIG. 1 illustrates five bolts 400 provided at an equal interval in a peripheral direction of the carrier 240. Meanwhile, the plurality of bolts 400 may be fixed relative to the carrier 240. The bolts 400 may penetrate not only the carrier 240 but also a wheel (not illustrated). In this case, because the carrier 240 and the wheel are fixed relative to each other by the bolts 400, the wheel may rotate together with the carrier 240 when the carrier 240 rotates. That is, according to the present disclosure, the power, which is generated by the rotation of the carrier 240, may be transmitted to the wheel through the bolts 400.

In more detail, the bolts 400 may each include: a bolt body 410 configured to define a body of the bolt and penetrate the carrier 240; and a bolt head 420 provided at one end in a longitudinal direction of the bolt body 410 and having a larger diameter than the through-hole of the carrier 240 which is penetrated by the bolt body 410. In more detail, the bolt head 420 may be provided at one (a left end based on FIG. 1) of the two opposite ends in the longitudinal direction of the bolt body 410 which faces the wheel bearing 100.

In this case, a third sealing part 330 may be provided on an outer surface of each of the plurality of bolts 400. In more detail, the third sealing part 330 may be provided in a boundary region between the bolt body 410 and the bolt head 420. Meanwhile, as described above, because the bolt 400 and the carrier 240 may be fixed relative to each other, the third sealing part 330 may be provided in a state of being fixed relative to the bolt 400 and the carrier 240. That is, the third sealing part 330 may be a stationary seal.

As described above, as in the first embodiment of the present disclosure, in the case in which the first sealing part 310 is provided between the carrier 240 and the outer race 120 without a separate sealing part provided outward from the first rolling element 142, the lubricating oil may flow between the first rolling element 142 and the first sealing part 310, and a part of the lubricating oil may leak to the outside through the space between the bolt 400 and the carrier 240. The third sealing part 330 may be configured to seal the region between the bolt 400 and the carrier 240.

Figure 4:
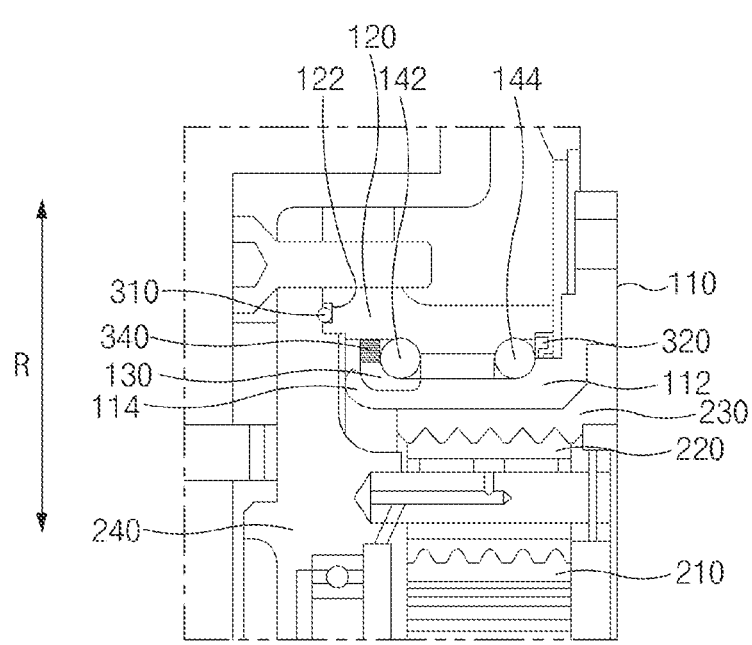
FIG. 4 is a radial cross-sectional view of an in-wheel drive device according to a second embodiment of the present disclosure.

FIG. 4 is a radial cross-sectional view of an in-wheel drive device according to a second embodiment of the present disclosure.

As illustrated in FIG. 4, according to the second embodiment of the present disclosure, the in-wheel drive device 10 may include a fourth sealing part 340 provided outward in the width direction W from the first rolling element 142, unlike the first embodiment of the present disclosure. In this case, the fourth sealing part 340 may separate the space between the planet gears 220 and the ring gear 230 provided in the speed reducer 200 from the space between the first rolling element 142 and the second rolling element 144. That is, unlike the first embodiment of the present disclosure, the second embodiment of the present disclosure may not have the lubricating oil flow path C (see FIG. 3). In addition, similar to the second sealing part 320, the fourth sealing part 340 may be provided to be movable relative to the hub 110 or the outer race 120. In more detail, some components of the fourth sealing part 340 may be provided to be movable relative to the hub 110 or the outer race 120. That is, the fourth sealing part 340 may be a rotary seal. According to the second embodiment of the present disclosure, the fourth sealing part 340 may be provided in addition to the first sealing part 310, which makes it possible to more effectively prevent the lubricating oil from leaking to the outside through the first rolling element 142.

Figure 5:
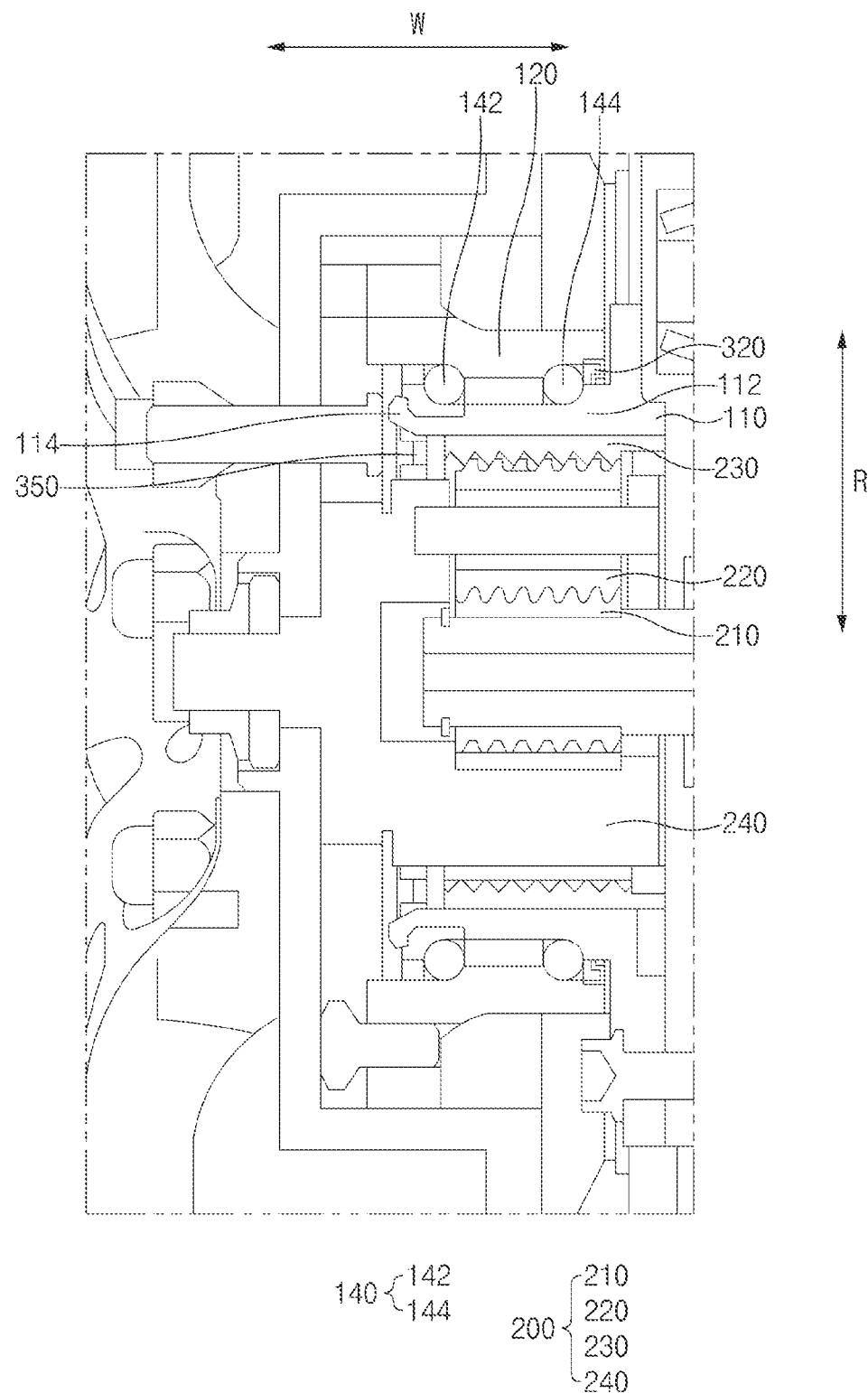
FIG. 5 is a radial cross-sectional view of an in-wheel drive device according to a third embodiment of the present disclosure.

FIG. 5 is a radial cross-sectional view of an in-wheel drive device according to a third embodiment of the present disclosure.

As illustrated in FIG. 5, according to the third embodiment of the present disclosure, the in-wheel drive device 10 may further include a fifth sealing part 350 provided inward in the radial direction R from the hub 110 of the wheel bearing 100. In more detail, the fifth sealing part 350 may be provided between the hub 110 and the carrier 240 in the radial direction R and may face the hub forming part 114 in the radial direction R. In addition, the fifth sealing part 350 may face the ring gear 230 in the width direction W. That is, according to the third embodiment of the present disclosure, the fifth sealing part 350 may be provided in a space defined by the hub 110, the carrier 240, and the ring gear 230. Meanwhile, as described above, the hub 110 may be a stationary race, and the carrier 240 may rotate in a state of being fixed to the outer race 120, which is a rotary race, and rotated. Therefore, the fifth sealing part 350 may be provided to be movable relative to the hub 110 or the carrier 240. In more detail, some components of the fifth sealing part 350 may be provided to be movable relative to the hub 110 or the carrier 240. That is, the fifth sealing part 350 may be a rotary seal.

Meanwhile, because the contents in the second and third embodiments of the present disclosure are not contradictory to the contents in the first embodiment of the present disclosure, the in-wheel drive device according to the present disclosure may have a structure made by a combination of the first embodiment and the second embodiment, a structure made by a combination of the first embodiment and the third embodiment, or a structure made by a combination of the first to third embodiments.

Vehicle

A vehicle according to the present disclosure may include the in-wheel drive device 10.

In this case, the in-wheel drive device 10 may include: the wheel bearing 100 including the hub; and the speed reducer 200 at least partially provided in the internal space of the wheel bearing 100.

The speed reducer 200 may include the plurality of planet gears 220, the ring gear 230 configured to engage with the planet gears 220, and the carrier 240 coupled to the planet gears and configured to transmit, to the outside, the power generated by the revolution of the plurality of planet gears 220. In addition, the first sealing part 310 may be provided in the region in which the carrier 240 and the wheel bearing 100 face each other.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

DESCRIPTION OF REFERENCE NUMERALS

10: In-wheel drive device
100: Wheel bearing
110: Hub
112: Hub body
114: Hub forming part
120: Outer race
122: Groove portion
130: Inner race
140: Rolling element
142: First rolling element
144: Second rolling element
200: Speed reducer
210: Sun gear
220: Planet gear
230: Ring gear
240: Carrier
240a: Carrier body
240b: Carrier head
300: Sealing part
310: First sealing part
320: Second sealing part
330: Third sealing part
340: Fourth sealing part
350: Fifth sealing part
400: Bolt
410: Bolt body
420: Bolt head
500: Outer race-carrier fixing member
C: Lubricating oil flow path
R: Radial direction of in-wheel drive device
W: Width direction of in-wheel drive device

What is claimed is:

1. An in-wheel drive device, comprising:
   a wheel bearing comprising a hub; and
   a speed reducer at least partially disposed in a radially internal space of the wheel bearing, and comprising:
   planet gears;
   a ring gear configured to engage the planet gears; and
   a carrier coupled to the planet gears and configured to transmit, to an outside of the in-wheel drive device, power generated by a revolution of the plurality of planet gears,
   wherein a first sealing part is disposed in a region in which the carrier and the wheel bearing face each other,
   wherein the wheel bearing further comprises an outer race disposed outward, in a radial direction of the in-wheel drive device from the hub,
   wherein the first sealing part is disposed in a region in which the carrier and the outer race face each other, and
   wherein a groove portion having a recessed shape is disposed in an area of the outer race that faces the carrier, and the first sealing part is disposed in the groove portion.

2. The in-wheel drive device of claim 1, wherein the first sealing part is fixed to the carrier and the wheel bearing.

3. The in-wheel drive device of claim 1, wherein the wheel bearing further comprises:
   rolling elements disposed in an internal space between the hub and the outer race; and
   a second sealing part spaced apart from the first sealing part in a width direction of the in-wheel drive device, such that the rolling elements are disposed between the second sealing part and the first sealing part.

4. The in-wheel drive device of claim 3, wherein the second sealing part is movable relative to the hub or the outer race.

5. The in-wheel drive device of claim 3, further comprising:
   bolts configured penetrating the carrier in the width direction; and
   a third sealing part disposed on an outer surface of each of the bolts.

6. The in-wheel drive device of claim 5, wherein the third sealing part is fixed to the bolt and the carrier.

7. The in-wheel drive device of claim 5, wherein the bolts each comprise:
   a bolt body penetrating a through-hole of the carrier; and
   a bolt head disposed at one end, in a longitudinal direction, of the bolt body and having a larger diameter than the through-hole of the carrier, and
   wherein the third sealing part is disposed in a boundary region between the bolt body and the bolt head.

8. The in-wheel drive device of claim 5, wherein the rolling elements comprise:
   a first rolling element disposed in the internal space between the hub and the outer race; and
   a second rolling element spaced apart from the first rolling element in the width direction, and
   wherein a distance between the first rolling element and the first sealing part is shorter than a distance between the second rolling element and the first sealing part.

9. The in-wheel drive device of claim 8, further comprising:
   a lubricating oil flow path configured to connect a space between the planet gears and the ring gear to a space between the first rolling element and the second rolling element.

10. The in-wheel drive device of claim 9, wherein the lubricating oil flow path is disposed in an outer region of the first rolling element, in the width direction.

11. The in-wheel drive device of claim 8, wherein the second sealing part is disposed in an outer region of the second rolling element, in the width direction, and is disposed in a space between the second rolling element, the outer race, and the hub.

12. The in-wheel drive device of claim 8, further comprising:
   a fourth sealing part disposed in an outer region of the first rolling element, in the width direction, wherein the fourth sealing part separates a space between the planet gears and the ring gear from a space between the first rolling element and the second rolling element.

13. The in-wheel drive device of claim 12, wherein the fourth sealing part is movable relative to the hub or the outer race.

14. The in-wheel drive device of claim 12, further comprising:
a fifth sealing part disposed inward, in the radial direction, from the hub.

15. The in-wheel drive device of claim 14, wherein the fifth sealing part is disposed between the hub and the carrier in the radial direction.

16. The in-wheel drive device of claim 15, wherein the fifth sealing part is movable relative to the hub or the carrier.

17. The in-wheel drive device of claim 16, wherein the hub comprises:
a hub body; and
a hub forming part having a shape bent toward the first rolling element and disposed at one end, among two opposite ends of the hub body, that is adjacent to the first rolling element, and
wherein the fifth sealing part faces the hub forming part in the radial direction.

18. A vehicle, comprising:
an in-wheel drive device comprising:
a wheel bearing comprising a hub; and
a speed reducer at least partially disposed in a radially internal space of the wheel bearing,
wherein the speed reducer comprises:
planet gears;
a ring gear configured to engage the planet gears; and
a carrier coupled to the planet gears and configured to transmit, to an outside of the in-wheel drive device, power generated by a revolution of the planet gears, and
wherein a first sealing part is disposed in a region in which the carrier and the wheel bearing face each other,
wherein the wheel bearing further comprises an outer race disposed outward, in a radial direction of the in-wheel drive device, from the hub,
wherein the first sealing part is disposed in a region in which the carrier and the outer race face each other, and
wherein the wheel bearing further comprises;
rolling elements disposed in an internal space between the hub and the outer race; and
a second sealing part spaced apart from the first sealing part in width direction of the in-wheel drive device, such that the rolling elements are disposed between the second sealing part and the first sealing part.

* * * * *